United States Patent [19]

Hayashi et al.

[11] Patent Number: 5,056,997
[45] Date of Patent: Oct. 15, 1991

[54] APPARATUS FOR INJECTING A GAS INTO MOLTEN RESIN IN A CAVITY OF AN INJECTION MOLDING MACHINE

[75] Inventors: Hiromi Hayashi; Yasuaki Ichinose, both of Tokyo; Hiroshi Harada, Kanagawa; Akimasa Kaneishi, Osaka, all of Japan

[73] Assignees: Mitsubishi Gas Chemical Company, Incorporated, Chiyoda; Nireco Corporation, Hackioji, both of Japan

[21] Appl. No.: 439,421

[22] Filed: Nov. 21, 1989

[30] Foreign Application Priority Data

Nov. 22, 1988 [JP] Japan .................. 63-295347

[51] Int. Cl.⁵ ............................... B29C 45/16
[52] U.S. Cl. .................... 425/130; 264/572; 425/589; 425/595
[58] Field of Search ............... 264/572; 425/130, 145, 425/522, 524, 589, 595, 590

[56] References Cited

U.S. PATENT DOCUMENTS 4,101,617 7/1978 Friederich .................. 264/572
4,693,676 9/1987 Inaba ........................ 425/145

FOREIGN PATENT DOCUMENTS

0250080 12/1987 European Pat. Off. .
0283207 9/1988 European Pat. Off. .
139716 6/1988 Japan .

Primary Examiner—Timothy Heitbrink
Attorney, Agent, or Firm—Burns, Doane, Swecker & Mathis

[57] ABSTRACT

A gas injection technique of injecting an inert gas (e.g., nitrogen gas) into a molten resin in a cavity, involves utilizing the strokes of reciprocation of a piston in the compression cylinder are used in a series mode, to perform a two-stage compression within the same cylinder, thereby providing a high-pressure gas. The method can also include establishing a relationship or pattern of the amount of movement of the piston with the speed of movement of the piston established to provide optimum control of the relationship between the pressure generated and piston stroke, and quantity of gas injected. The injecting gas pressure can be detected, to control a hold pressure, or the relationship between a piston stroke and generated pressure, so as to obtain optimal injecting pressure during the injection molding operation. A gas injection apparatus comprises a compression cylinder with a piston wherein the volumes of the two chambers on both sides of the piston are of such a compression ratio to provide the first compression. The apparatus also includes pipe lines communicating the two chambers with each other through a check valve, a gas supplying conduit pipe connected upstream of the check valve, and a conduit pipe connecting the chamber located downstream of the check valve to the cavity, wherein the piston is reciprocated to perform two-stage compression to provide a high pressure gas as required.

9 Claims, 5 Drawing Sheets

APPARATUS FOR INJECTING A GAS INTO MOLTEN RESIN IN A CAVITY OF AN INJECTION MOLDING MACHINE

BACKGROUND OF THE INVENTION

The present invention generally relates to injection molding, and in particular, to a technique in which a gas is injected into the molten resin in a cavity which forms the molded article. With such techniques, a high pressure gas has been needed in the past to inject an inert gas into the molten resin. The high pressure gas has typically been provided by connecting a hydraulic cylinder directly to a gas compressor piston. The maximum thrust, $F_1MAX$, necessary for compression is best represented by the formula:

$$F_1MAX = A_1 P_1 MAX$$

In the above formula, $A_1$ is the compression cylinder's sectional area, and $P_1MAX$ is the final compression pressure.

As might be expected, such a method requires a great amount of thrust, and thus, usually employs a large oil pressure generating unit. Furthermore, the gas temperature is abruptly increased because maximum pressure is obtained through one-stage compression. Also, the stress applied to members forming the compression cylinder must be within allowable stress limits of the material, which is a function of the gas temperatures which result from compression. Thus, the members must be extremely large in thickness. The manufacturing costs, therefore, are often unavoidably high, and suitable locations for installation of compression cylinders is limited.

While two-stage and three-stage gas compressors, with intermediate gas coolers have been developed in the art, they are normally intricate and very complex in design, and the manufacturing costs are also high.

The pressure of the gas injected into the molding is, in general, controlled by setting the hydraulic pressure applied to the hydraulic cylinder. Unfortunately, optimal control of this parameter has been difficult to obtain. For example, in a method disclosed in Japanese Patent Application (OPI) No. 139716/1988 (the term "OPI" as used herein means an "unexamined published application"), a second compression is carried out by using another high pressure inert gas. However, in that method no pressure control is utilized, and there is only one-way compression. Thus, the pressure is not economically used.

SUMMARY OF THE INVENTION

Accordingly, a primary overall object of the invention is to provide a technique for injecting an inert gas into the molten resin to form the molded article having a hollow pat which effectively addresses those above-described problems associated with conventional gas injection techniques.

More specifically, it is an object of the invention to provide a technique using a gas compressor which is small in size and simple in design, as a peripheral unit of an injection molding machine.

It is also an object of the invention to produce high pressure as required without ordinary continuous operation.

It is even a further object of the invention to reduce the drive power and the rise in gas temperature of the compression cylinder, and reduce the manufacturing cost.

It is also an object of the invention to provide a method in which the program control of the gas pressure can be effectively controlled according to the type of resin which is used for manufacturing the molding.

Another object of the invention is to provide a method in which the configuration of the molding can be effectively controlled whereby the resultant molding is improved in quality.

The aforementioned objects of the invention, as well as others not specifically enumerated above, can be obtained by utilizing a gas injection technique of injecting an inert gas (e.g., nitrogen gas) into a molten resin in a cavity, wherein the strokes of reciprocation of a piston in the compression cylinder are used in a series mode, to perform a two-stage compression within the same cylinder, thereby providing a high-pressure gas.

In another aspect of the invention, during gas injection a relation pattern of the amount of movement of the piston with the speed of movement of the piston is established to provide optimum control of the relationship between the pressure generated and piston stroke, and quantity of gas injected.

In another aspect of the invention, the injecting gas pressure is detected, to control a hold pressure, or the relationship between a piston stroke and generated pressure, so as to obtain optimal injecting pressure during the injection molding operation.

Another aspect of the invention relates to a novel gas injection apparatus. The apparatus comprises a compression cylinder with a piston wherein the volumes of the two chambers on both sides of the piston are of such a compression ratio to provide the first compression, pipe lines communicating the two chambers with each other through a check valve, a gas supplying conduit pipe connected upstream of the check valve, and a conduit pipe connecting the chamber located downstream of the check valve to the cavity, wherein the piston is reciprocated to perform two-stage compression to provide a high pressure gas as required.

In another embodiment of the apparatus, the piston is driven by an electric motor, and the torque of the electric motor is transmitted through a power transmitting device comprising feed nuts and screws.

BRIEF DESCRIPTION OF THE DRAWINGS

Preferred embodiments of the present invention will be described in greater detail below with reference to the accompanying drawings, wherein like elements bear like reference numbers unless indicated otherwise.

Unless indicated otherwise, in the drawings (1) represents a cylinder; (2) represents a piston; (3) represents a rod; (4) represents a compression chamber on the head side; (5) represents a compression chamber on the rod side; (6) and (7) represent check valves; (s), (9) and (20) represent electromagnetic valves; (10) and (11) represent pipe lines; (12) and (13) represent conduit pipes; (21) represents a slide block; (22) represents ball nuts; (23) represents a feed screw; (24) and (26) represent pulleys; (25) represents a motor; (27) represents an origin sensor; (29) represents a rotary encoder; (30) and (31) represent pressure sensors; (33) represents a control unit; (34) represents a constant setting unit; (35) represents a microcomputer system; and (38) represents a thermometer.

While the invention will be described below in connection with preferred embodiments thereof, it will be understood that this description is not intended to limit the invention to those embodiments. To the contrary, it is intended to cover all alternatives, modifications, and equivalents as may be included within the spirit and scope of the invention as defined by the appended claims.

DETAILED DESCRIPTION OF THE PREFERRED EMBODIMENTS

As described above, in the gas compressor according to the invention, the first compression is carried out by moving the piston towards the head to supply compressed gas into the two chambers on both sides of the piston. The second compression is carried out by moving the piston towards the rod to pressurize it as required and to charge the chamber on the head side with the inert gas from the gas supplying source. That is, one compression cylinder is used for two-stage compression, and the second compression and the charging of the chamber with gas are carried out simultaneously. Therefore, the gas compressor of the invention is smaller in size than conventional single stage compressors, and is less complex in design than conventional multi-stage compressors. Thus, a high pressure gas compressor which is simple in design and suitable as peripheral equipment for an injection molding machine, or the like, is provided by the invention. The gas compressor of the invention needs no hydraulic drive, i.e., it can be effectively driven by an electric motor, whereby it can be program-controlled in various ways.

The operating principle of a gas compressor according to the invention will be described with reference to FIGS. 1(a)–1(c). In this embodiment piston (2) reciprocates inside cylinder (1). A piston rod (3) is provided which is sufficiently large in diameter with the proviso that the volume ratio of head-side chamber (4) to rod-side chamber (5) is so determined that a first compression ratio is set to a predetermined value. Chambers (4) and (5) are connected through pipe lines (10) and (11) with check valve (7) therebetween. Pipe line (10) is connected to a gas supply source such as a gas cylinder through pipe line (12) including check valve (6). Chamber (5) is connected to an injection molding machine through conduit pipe (13) which includes an electromagnetic valve (9). The pressure in conduit pipe (13) is detected by pressure sensor (31). Check valve (7) and pipe lines (10) and (11) may be built in piston (2).

Figure 1A:
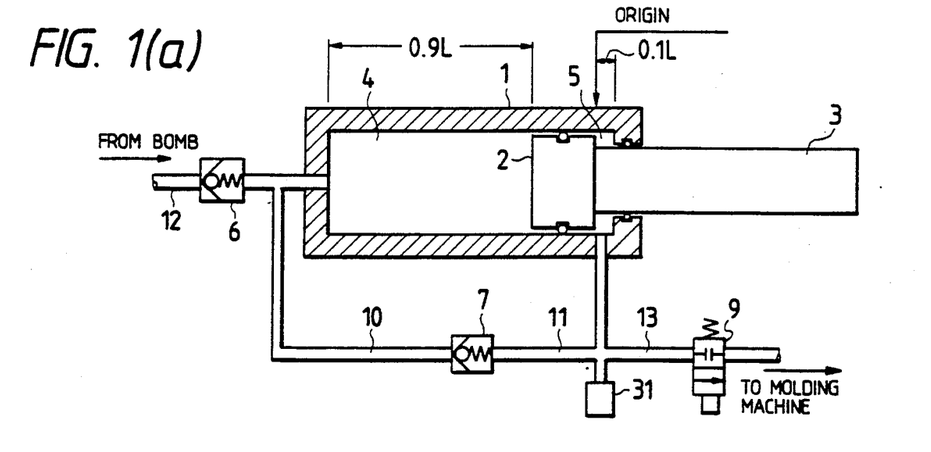
FIG. 1(a), 1(b) and 1(c) are schematic diagrams for explaining the operating principle of a two-stage compression type inert gas injecting apparatus according to the invention.

During operation (see FIG. 1(a)), piston (2) is at the end of the stroke on the rod side, and the sum of the volumes of chambers (4) and (5) is at a maximum. Under this condition, an inert gas (e.g., nitrogen gas) at a predetermined pressure is introduced into chamber (4) through conduit pipe (12) and check valve (6). As piston (2) is moved to the left by pushing piston rod (3), the volume of chamber (4) is decreased, while the volume of chamber (5) is increased. As a result, the gas in chamber (4) flows into the chamber (5) through pipe lines (10) and (11) and check valve (7). As was described above, rod (3) is sufficiently large in diameter, and the volume ratio of chambers (4) and (5) is so determined as to provide a predetermined first compression. Therefore, the gas is compressed while the piston is moving to the left, and the piston reaches the stroke end as shown in FIG. 1(b). At this point, the first compression has been accomplished. It is assumed that the pressure of the gas supplied by the gas supplying source has a set value. By determining the end of the stroke on the head side, the compression ratio is changed, and the pressures in chambers (4) and (5) are set to predetermined values. The state shown in FIG. 1(a) is changed slowly into that shown in FIG. 1(b). The state shown in FIG. 1(b) is held unchanged for a certain period of time, and therefore, the heat generated by the first compression is dissipated.

Then, the rod-side stroke of piston (2) is started (i.e., piston (2) is moved to the right), so that the chamber (5) is compressed. As a result, check valve (?) of pipe lines (10) and (11), is closed, so that the chambers (4) and (5) are isolated from each other. Chamber (4) is filled with the gas supplied from the gas supplying source through conduit pipe (12) and check valve (6).

With electromagnetic valve (9) closed, the pressure of the gas in the chamber (5) is increased. FIG. 1(c) shows the state of the gas compressor in which the piston is being moved. Under this condition, the pressure of chamber (5) is increased by approximately two times; the second compression being performed. Pressure sensor (31) detects when the pressure in chamber (5) reaches a predetermined value, to open electromagnetic valve (9), as a result of which the high pressure gas is supplied through conduit pipe (13) to an injection molding machine. Thus, the gas compressor functions as a two-stage compressor by utilizing the reciprocation of piston (2).

If the initial position of piston (2) is at 0.1 L in FIG. 1(a) (where L is the stroke of piston (2)), then the second compression ratio will be 10. The first compression ratio is the volume ratio of the chambers illustrated in FIG. 1(a) and FIG. 1(b), and is as follows:

The volume $V_1$ of FIG. 1(a) is:

$$V_1 = \pi D^2 L/4 - \pi d^2 0.1L/4 = (D^2 - 0.1d^2)\pi L/4.$$

Figure 1B:
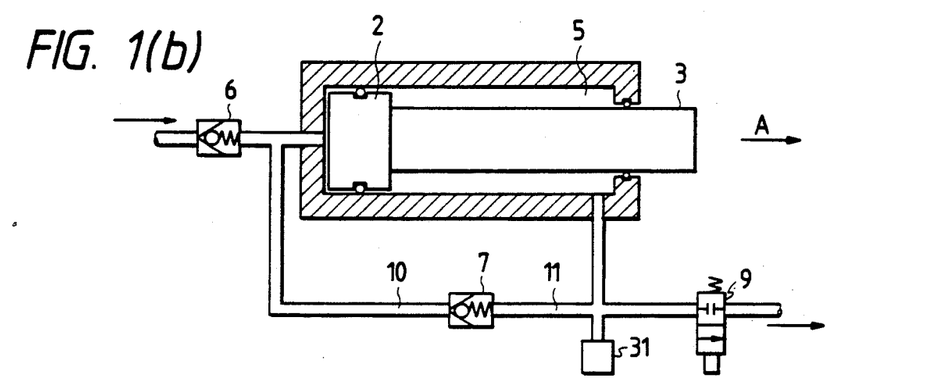
Figure 1C:
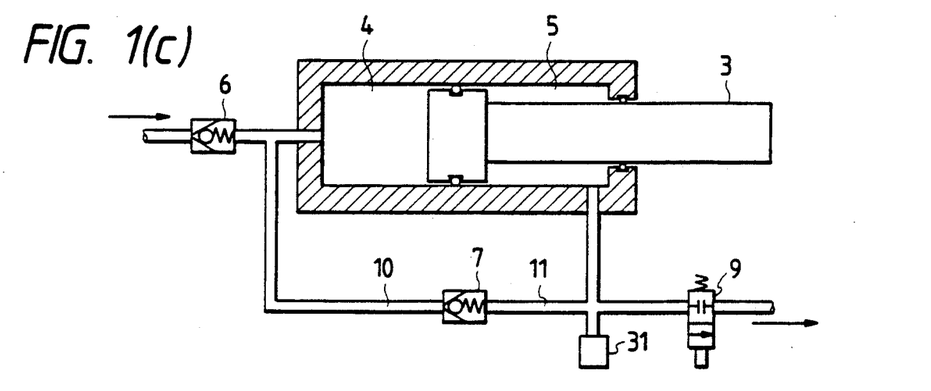

The volume $V_2$ of FIG. 1(b) is:

$$V_2 = \pi D^2 L/4 - \pi d^2 L/4 = (D^2 - d^2)\pi L/4.$$

The volume ratio is:

$$V_1/V_2 = (D^2 - 0.1d^2)/(D^2 - d^2).$$

Wherein D is the inside diameter of the cylinder and d is the diameter of the rod. If, in the first compression, the maximum compression ratio is 3, then d=0.83D. For instance, with D=80 mm, then d=66.4 mm.

Therefore, if the inert gas is supplied to chamber (4) at a gas supplying pressure of 30 kg/cm², then the pressure in chamber (5) will be 90 kg/cm² at the end of the first compression. In the case where the second compression ratio is ten, the final pressure will be 900 kg/cm².

In this case, the maximum tensile force $F_1MAX$ acting on piston rod (3) is as follows:

$$F_1MAX = 900 (A-a) - 30A = 12543 \text{ kg};$$

where A is 50.2 cm² which is the sectional area of the cylinder, and a is 34.6 cm² which is the sectional area of the piston rod.

In contrast to the invention, in conventional one-stage compression methods, the piston rod depressing force to obtain a pressure of 900 kg/cm² is:

$$F_1 = 900 \text{ kg/cm}^2 \times 50.2 \text{ cm}^2 = 45180 \text{ kg}$$

As is apparent from the above description, the required depressing force is reduced to one-third or less by the two-stage compression according to the invention. In one-stage compression, with a compression ratio of 30, the temperature is greatly increased by gas adiabatic compression.

Figure 2:
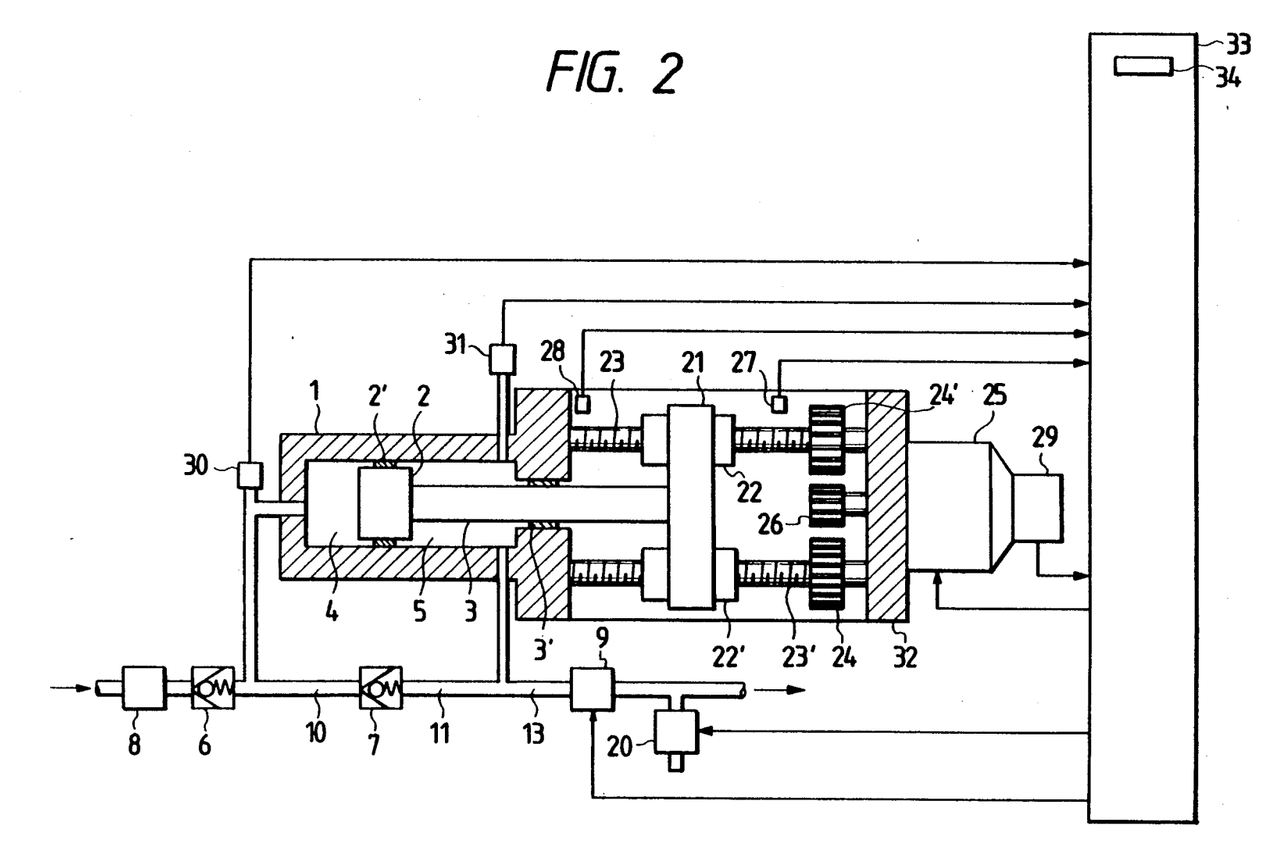
FIG. 2 is an explanatory diagram showing the arrangement of one embodiment of a gas injecting apparatus according to the invention.

FIG. 2 shows an example of a gas injecting apparatus with the gas compressor shown in FIG. 1. The cylinder (1), the piston (2) and the rod (3) are sealingly engaged with one another with sealing members (2') and (3'). The right end of piston rod (3) is fixedly connected to a slide block (21). Ball nuts (22) and (22') are fixedly secured to slide block (21) and threadably engaged with feed screws (23) and (23'), respectively. Both end portions of each of the feed screws (23) and (23') are rotatably supported through bearings (not shown) on a base (32). Pulleys (24) and (24') are fixedly mounted on the right end portions of feed screws (23) and (23), respectively, and they are driven by electric motor (25) through a timing belt which is laid over pulleys, and pulley (26) is fixedly mounted on the output shaft of the motor. As the motor rotates, the torque of the motor is transmitted through pulleys (26), (24) and (24'), feed screws (23) and (23'), ball nuts (22) and (22'), slide block (21), and the piston rod (3) to piston (2), so that the piston (2) is moved in a direction. Air-pressure-operated electromagnetic valves (8), (9) and (20) are connected to conduit pipes (12) and (13), and are operated (opened and closed) in response to instructions from control unit (33), to control the supply of gas or the injection of gas in the injection molding apparatus.

The motion of piston (2) is monitored by control unit (33) through an arithmetic operation. More specifically, a microcomputer in the control unit performs an arithmetic operation by using the angle of rotation of the motor shaft which is provided by a rotary encoder (29) with the output of origin sensor (27) as a reference, the pulley speed reduction ratio, and the feed screw pitch, to monitor the motion of piston (2). A piston stroke sensor 28 is also provided.

The pressures in chambers (4) and (5) are detected by pressure sensors (30) and (31), and are subjected to analog-to-digital (A/D) conversion in control unit (33), thereby to monitor the gas supplying pressure, the first compression pressure, and the second compression pressure, whereby in each molding step, the pressure is controlled or monitored. The pressures, and the amount of movement of the piston are displayed on a panel, and recorded by a recorder.

The gas compressor according to the invention operates in the following two modes, modes 1 and 2.

Mode 1

In the case where an inert gas cylinder is the inert gas supplying source, in order to minimize the quantity of gas remaining in the cylinder (i.e., to economically use the inert gas), the pressure for charging the gas into chamber (4) is set to a low value, and the necessary gas injecting pressure is obtained with the maximum compression ratio provided when the piston is moved its full stroke in the compression cylinder.

Mode 2

In the case where the inert gas cylinder is provided with a booster, the gas can be charged, at a certain pressure, into chamber (4) independently of the pressure in the cylinder. Therefore, the desired injecting pressure is obtained by controlling the amount of movement of the piston.

Figure 3A:
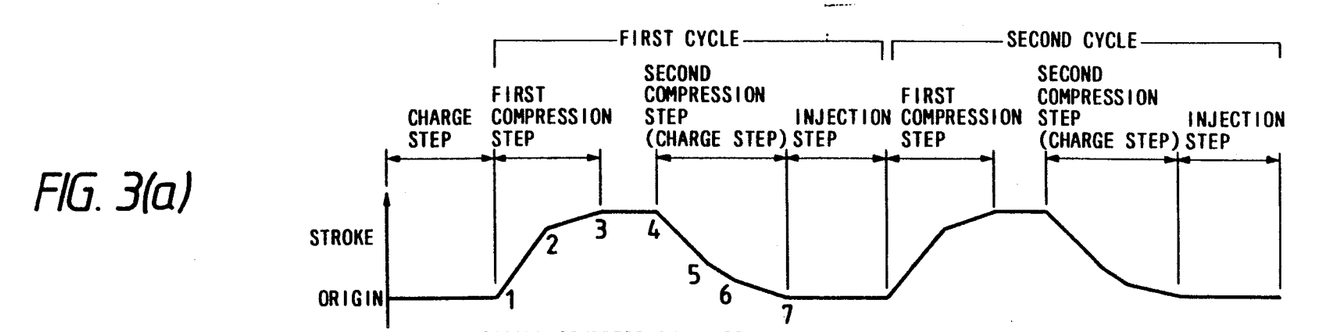
FIGS. 3(a), 3(b), 3(c), 3(d), 3(e), 3(f) and 3(g) are time charts illustrating the operation of the apparatus shown in FIG. 2 in Mode 1.
Figure 3B:
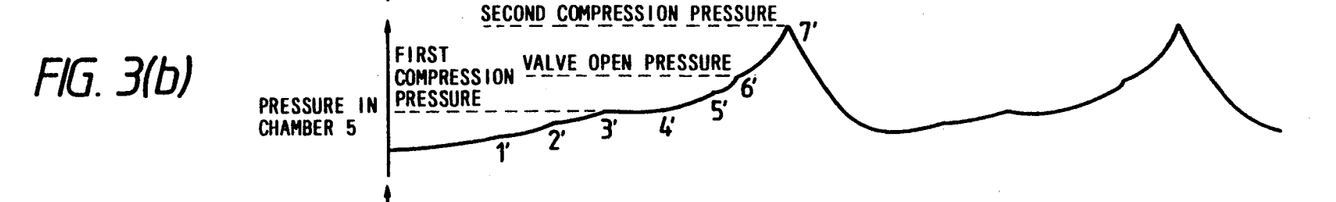
Figure 3C:
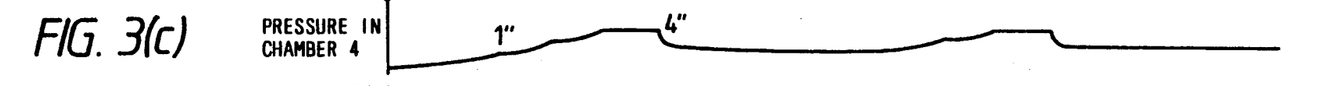
Figure 3D:
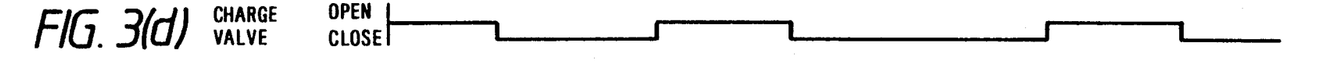
Figure 3E:
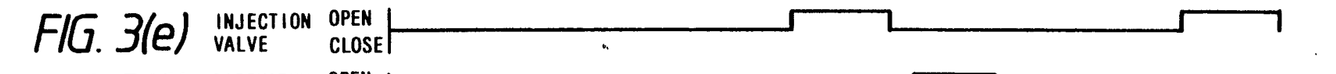
Figures 3F, 3G:
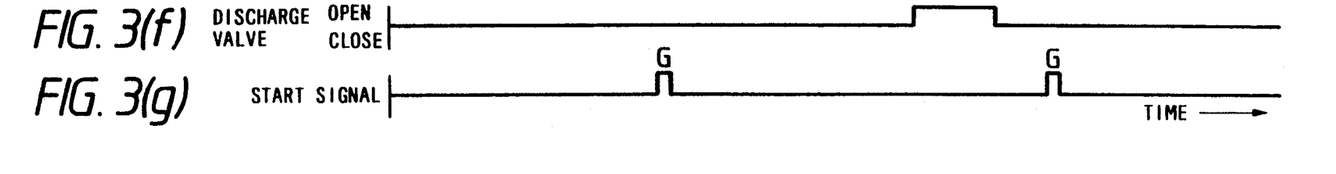

FIGS. 3(a)-3(g) set forth a time chart representing the operation of the gas injecting apparatus in Mode 1. FIG. 3(a) shows the movement of the piston from the origin; FIG. 3(b) shows the change in pressure in chamber (5); FIG. 3(c) shows the change in pressure in chamber (4); FIG. 3(d) shows the operation (opening and closing) of gas supplying valve (8); FIG. 3(e) shows the operation (opening and closing) of injecting valve (9); and FIG. 3(f) shows the operation (opening and closing) of the discharge valve (20); and FIG. 3(g) shows a start signal provided by the injection molding machine.

First, it is determined from a piston position signal that the piston is at the origin, and charging valve (8) is opened to charge inert gas into chamber (4). In this operation, the pressure is detected by the pressure sensor (30). When the pressure reaches a charge pressure set by constant setting unit (34) mounted on the panel of the control unit (33), valve (8) is closed. In the above-described embodiment, the first compression ratio can be 3, and the second compression ratio can be 10, with a total compression ratio of 30. Therefore, for instance in the case of an injection pressure of 300 kg/cm², the gas supplying pressure is 10 kg/cm². The secondary pressure of the cylinder will be made somewhat higher.

After chamber (4) has been charged with the gas, the first compression is started in response to an instruction from the control unit. That is, motor (25) is operated to move piston (2) towards the head. The speed of rotation of the motor, (i.e., the speed of movement of the piston) can be set to various values by constant setting unit (34) on control unit (33). For instance, the piston starts the first compression at the speed which is set at the first position represented by FIG. 3(a), and the amount of movement thereof is detected by the rotary encoder (29). When the motor reaches the second position, the speed of the motor is decreased, thereby preventing a pressure rise and a rise in temperature. The second position can be arbitrarily determined and the corresponding change in speed can also be set arbitrarily. At the third position, the first compression is ended, and motor (25) is stopped. The compression ratio obtained is three.

It can be determined that the pressure in chamber (5) has reached a predetermined value by referring to pressure sensor (31). Thus, the apparatus is ready to receive start signal G from the injection molding machine.

In FIG. 3(b), positions (1'), (2') and (3'), corresponding to the first, second and third piston positions in FIG. 3(a), respectively, indicate a change in pressure of chamber (5). In FIG. 3(c), positions (1") and (4"), corresponding to the first and fourth piston positions in FIG. 3(a), respectively, indicate a change in the pressure of chamber (4).

Upon receipt of the start signal, G, motor (25) is rotated in the reverse direction, thus starting the second compression. That is, the piston is moved from the fourth position toward the rod at a predetermined speed. When the piston reaches the fifth position, the speed is decreased. The piston is moved at a much lower speed from the sixth position to the seventh position, while the compression ratio is further increased. Thus, the rise of gas temperature due to abrupt compression, and the abnormal rise of gas pressure caused by the rise of gas temperature, are prevented.

The fifth and sixth positions, and the speed of the piston can be determined arbitrarily by constant setting unit (34).

In FIG. 3(b), positions (4'), (5'), (6') and (7') correspond to the fourth, fifth, sixth and seventh piston positions in FIG. 3(a), respectively. When it is confirmed that the pressure at the position (7') is within a predetermined range, injecting electromagnetic valve (9) is opened, so that the inert gas is injected into the molten resin in the injection molding machine with an injecting nozzle (not shown), In the case of FIGS. 3(a)–3(g), electromagnetic valve (9) is opened when the piston is at the seventh position, which is the end of the piston stroke. However, the stroke position where electromagnetic valve (9) is opened may be selected arbitrarily.

In the case where injecting electromagnetic valve (9) is opened in a pressure mode, a pressure value is predetermined by operating constant setting unit (34) so that electromagnetic valve (9) is opened when the pressure in chamber (5) reaches the predetermined pressure value, even if the piston is not at the end of the stroke.

Figures 4A, 4B:
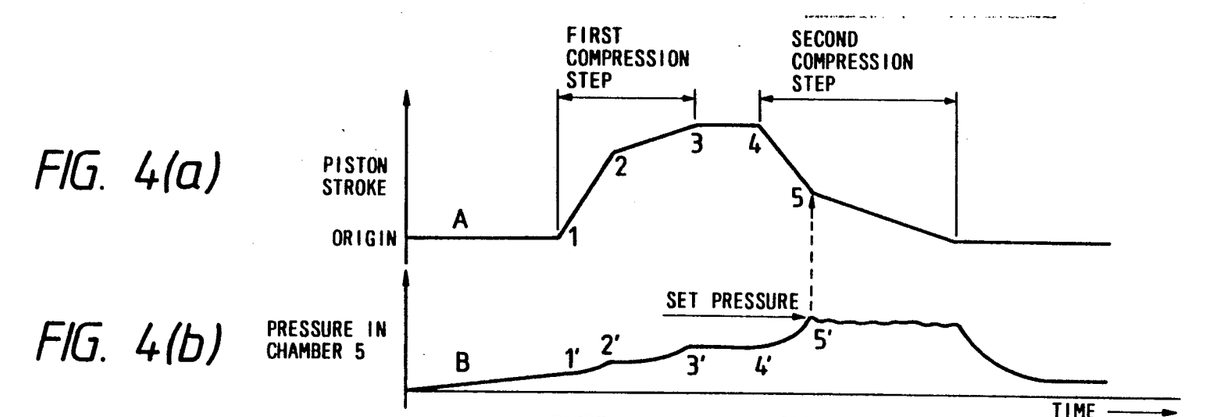
FIGS. 4(a) and 4(b) are time charts illustrating the operation of the apparatus shown in FIG. 2.

In the case where the pressure value is preset to that at position (5') shown in FIG. 4(b), when the pressure in chamber (5) reaches the pressure value at the position (5'), electromagnetic valve (9) is opened, so that the inert gas is injected into the molten resin. The speed of movement of the piston is so controlled that the set pressure is maintained unchanged. That is, the pressure in chamber (5) is detected by pressure sensor (31), the output of which is subjected to analog-to-digital conversion and applied to control unit (33). Control unit (33) compares the set pressure with detected pressure, to control the speed of the motor at short time intervals, thereby to maintain the injecting pressure unchanged. In the case represented by FIGS. 4(a) and 4(b), the set pressure is constant. However, it may be changed stepwise. In this regard, the pressure may be program-controlled with respect to the piston stroke.

As shown in FIG. 3(c), with respect to the pressure in chamber (4), the first compression is accomplished at position (4''). As the second compression is carried out, the volume of chamber (4) is increased, while the pressure is abruptly decreased, and charging valve (8) is opened, so as to charge the chamber with inert gas. When the pressure in chamber (4) becomes lower than the secondary adjusting pressure of the gas supplying source, check valve (6) is opened. As a result, the gas is supplied into chamber (4), and it is maintained substantially at a constant pressure during the expansion stroke of the piston. When the piston reaches the end of the stroke, the charging of chamber (4) is ended. Now, chamber (4) is ready for the next compression.

In Mode 2, the compression ratio of the first compression, and the compression ratio of the second compression are functions of the amount of movement of the piston in the first compression. A charging pressure for chamber (4), and a necessary injecting pressure, are set by constant setting unit (34) on the control panel, and control unit (33) determines the amount of movement of the piston.

Figure 5A:
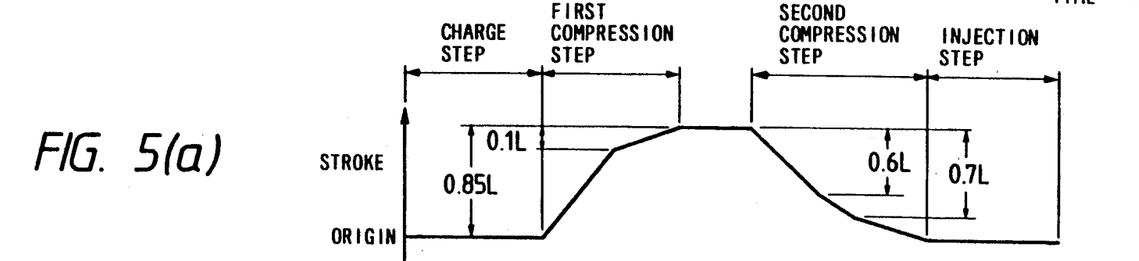
FIGS. 5(a) and 5(b) illustrate a modification of the time chart shown in FIG. 3.
Figure 5B:
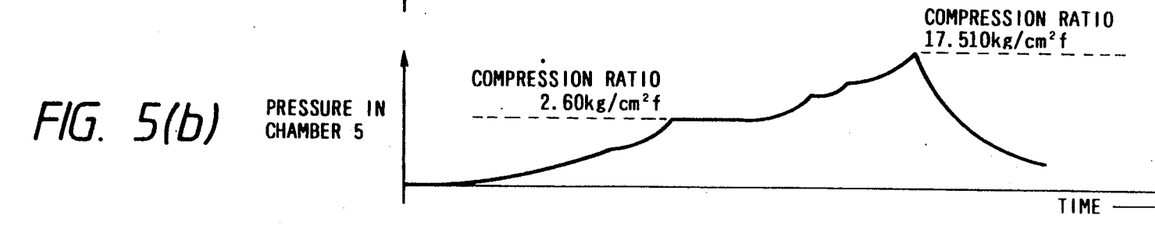

FIGS. 5(a) and 5(b) show the movement of the piston and the pressure in chamber (5) in the case where the charging pressure is 30 kg/cm$^2$, and the maximum injecting pressure is 510 kg/cm$^2$.

In the first compression, the amount of movement of the piston is 85% of the piston stroke, and at the position the required pressure 60 kg/cm$^2$ is detected by pressure sensor (31). In response to the start signal from the injection molding machine, the second compression is started. When the piston reaches the end of the stroke, the compression ratio is 8.5, and the maximum injecting pressure is 510 kg/cm$^2$. Pressure sensor (31) detects that the pressure in chamber (5) is within the predetermined range of pressures.

Figure 6:
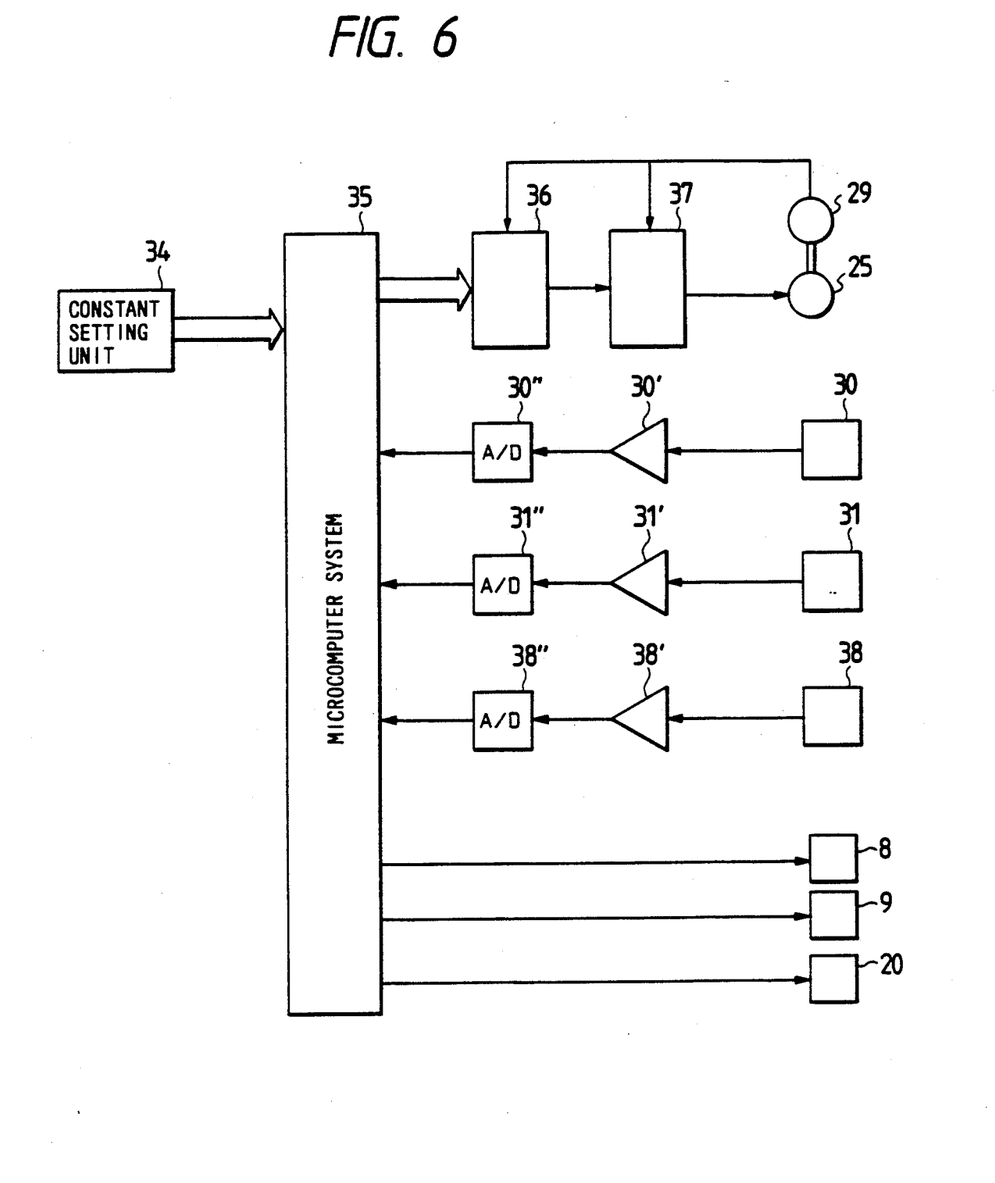
FIG. 6 is a block diagram showing the arrangement of the control unit shown in FIG. 2.

FIG. 6 is a block diagram showing the arrangement of control unit (33). Constant setting unit (34) operates to set: (i) the speed of movement of the piston and the positions where the speed of movement of the piston is changed in the first compression; (ii) the upper and lower limits for the pressure in chamber (4); (iii) the maximum amount of movement of the piston; (iv) the speed of movement of the piston and the positions where the speed of movement of the piston is changed in the second compression; (v) the distance from the stroke end where the injecting electromagnetic valve is opened; (vi) the pressure for opening the injecting valve in the pressure mode, and (vii) applies instruction signals to microcomputer system (35), and displays them on the panel.

The microcomputer system (35) operates to set speeds, speed-changing positions, and amounts of movement of the piston for motor control unit (36). A motor driver 37 is also provided.

The pressure sensors (30) and (31) detect the pressures in chambers (4) and (5). The detection outputs of pressure sensors (30) and (31) are applied respectively through amplifiers (30') and (31') and A/D converters (30'') and (31'') to microcomputer system (35), where they are compared with the values preset, so that the pressures therein are controlled as required. The microcomputer system (35) further operates to operate (open and close) charging valve (8), the injecting valve (9), and the discharging valve (20).

A thermometer (38) detects the temperature inside chamber (5). The detection output of thermometer (38) is applied through amplifier (38') and an A/D converter (38'') to the microcomputer system (35), where it is detected whether or not the gas temperature is in a predetermined range of temperatures.

Accordingly, completely unlike conventional continuously operating compressors, the gas compressior of the present invention can provide one stroke operation as peripheral equipment of an injection molding machine when required. The gas compressor of the invention is much simpler in design than conventional gas compressors, and has programmed data-setting functions. As a result, it is capable of meeting the requirements for various moldings. It can also perform gas injection under optimal conditions. Thus, the invention will greatly contribute to the improvement in quality of moldings formed by injection, and improve work efficiency.

The invention is most suitable for the formation of large plastic products. The rise of temperature of the compressor actually measured can be lower than 20° C. Since the compressor is operated electrically, it can be readily program-controlled, and it needs no hydraulic auxiliary devices such as an oil feeder which is required for hydraulic control.

The foregoing description of the invention in primary part portrays particular preferred embodiments in accordance with the requirements of the patent statutes and for purposes of explanation and illustration. It will be apparent, however, to those skilled in the art, that many modifications and changes in the specifically described methods may be made without departing from the scope and spirit of the invention. It is the intention in the following claims to cover such modifications and variations as in the true spirit and scope of the invention.

What is claimed is:

1. An apparatus for pressurizing gas through two-stage compression and for injecting the pressurized gas into a molten resin to produce a molded article having a hollow part, comprising:

a compression cylinder defining a compression chamber, said compression chamber including oppositely positioned first and second sides;

a piston positioned in the compression chamber for reciprocating movement to perform two-stage compression of said gas, said piston being connected to a piston rod having a predetermined size so that a compression ratio of the gas at the first compression stage is determined by the ratio of a volume of the compression cylinder when the piston is moved to the second side of the compression chamber and the volume of the compression cylinder when said piston is moved to the first side of said compression chamber;

communication means for fluidly communicating the first side of the compression chamber with the second side of the compression chamber;

valve means disposed along the communication means for permitting the flow of fluid from the first side of the compression chamber to the second side of the compression chamber during a first compression stage in which the piston moves toward the first side of the compression chamber, and for isolating the first side of the compression chamber from the second side of the compression chamber during a second compression stage in which the piston moves toward the second side of the compression chamber;

a gas supplying conduit pipe through which said gas can be supplied to the compression chamber, said gas supplying conduit being in fluid communication with the compression chamber;

a conduit pipe for permitting said pressurized gas which has been pressurized in the compression chamber to be supplied to an injection molding apparatus, said conduit pipe being in fluid communication with the compression chamber; and a motor for causing reciprocating movement of the piston within the compression chamber, said motor having an output shaft which is coupled to two feed screws, said piston being connected to a piston rod and said piston rod being connected to a sliding block, said sliding block being fixedly connected to ball nuts mounted on the feed screws so that operation of the motor causes rotation of the output shaft and the feed screws which in turn cause movement of the sliding block relative to the feed screws and corresponding movement of the piston.

2. The apparatus according to claim 1, including a check valve positioned in the gas supplying conduit pipe, said gas supplying conduit pipe being connected to the communication means at a point between the first side of the compression chamber and the valve means.

3. The apparatus according to claim 1, including an electromagnetic valve positioned in the conduit pipe, said conduit pipe being connected to the first communication means at a point between the second side of the compression chamber and the valve means.

4. An injection molding apparatus for molding articles including means for injecting an inert gas into a molten resin in a cavity, said means for injecting an inert gas comprising:

a compression cylinder defining a compression chamber, said compression chamber including oppositely positioned first and second sides;

a piston positioned in the compression chamber for reciprocating movement to perform two-stage compression of said gas, said piston being connected to a piston rod having a predetermined size so that a compression ratio of the gas at the first compression stage is determined by the ratio of a volume of the compression cylinder when the piston is moved to the second side of the compression chamber and the volume of the compression cylinder when said piston is moved to the first side of said compression chamber;

communication means for fluidly communicating the first side of the compression chamber with the second side of the compression chamber;

valve means disposed along the communication means for permitting the flow of fluid from the first side of the compression chamber to the second side of the compression chamber during a first compression stage in which the piston moves toward the first side of the compression chamber, and for isolating the first side of the compression chamber from the second side of the compression chamber during a second compression stage in which the piston moves toward the second side of the compression chamber;

a gas supplying conduit pipe through which said gas can be supplied to the compression chamber, said gas supplying conduit being in fluid communication with the compression chamber;

a conduit pipe for permitting said pressurized gas which has been pressurized in the compression chamber to be supplied to a molding machine, said conduit pipe being in fluid communication with the compression chamber; and a motor for causing reciprocating movement of the piston within the compression chamber, said motor having an output shaft which is coupled to two feed screws, said piston being connected to a piston rod and said piston rod being connected to a sliding block, said sliding block being fixedly connected to ball nuts mounted on the feed screws so that operation of the motor causes rotation of the output shaft and the feed screws which in turn cause movement of the sliding block relative to the feed screws and corresponding movement of the piston.

5. An apparatus for pressurizing gas through two-stage compression and for injecting the pressurized gas into a molten resin to produce a molded article having a hollow part, comprising:
- a compression cylinder defining a compression chamber, said compression chamber including oppositely positioned first and second sides;
- a piston positioned in the compression chamber for reciprocating movement to perform two-stage compression of said gas;
- communication means for fluidly communicating the first side of the compression chamber with the second side of the compression chamber;
- valve means disposed along the communication means for permitting the flow of fluid from the first side of the compression chamber to the second side of the compression chamber during a first compression stage in which the piston moves toward the first side of the compression chamber, and for isolating the first side of the compression chamber from the second side of the compression chamber during a second compression stage in which the piston moves toward the second side of the compression chamber;
- a gas supplying conduit pipe through which said gas can be supplied to the compression chamber, said gas supplying conduit being in fluid communication with the compression chamber;
- a conduit pipe for permitting said pressurized gas which has been pressurized in the compression chamber to be supplied to an injection molding apparatus, said conduit pipe being in fluid communication with the compression chamber; and
- a motor operatively associated with said piston for causing reciprocating movement of the piston within the compression chamber.

6. The apparatus according to claim 5, including a check valve positioned in the gas supplying conduit pipe, said gas supplying conduit pipe being connected to the communication means at a point between the first side of the compression chamber and the valve means.

7. The apparatus according to claim 5, including an electromagnetic valve positioned in the conduit pipe, said conduit pipe being connected to the first communication means at a point between the second side of the compression chamber and the valve means.

8. The apparatus according to claim 5, wherein said motor is an electric motor.

9. An injection molding apparatus for molding articles including means for injecting an inert gas into a molten resin in a cavity, said means for injecting an inert gas comprising:
- a compression cylinder defining a compression chamber, said compression chamber including oppositely positioned first and second sides;
- a piston positioned in the compression chamber for reciprocating movement to perform two-stage compression of said gas;
- communication means for fluidly communicating the first side of the compression chamber with the second side of the compression chamber;
- valve means disposed along the communication means for permitting the flow of fluid from the first side of the compression chamber to the second side of the compression chamber during a first compression stage in which the piston moves toward the first side of the compression chamber, and for isolating the first side of the compression chamber from the second side of the compression chamber during a second compression stage in which the piston moves toward the second side of the compression chamber;
- a gas supplying conduit pipe through which said gas can be supplied to the compression chamber, said gas supplying conduit being in fluid communication with the compression chamber;
- a conduit pipe for permitting said pressurized gas which has been pressurized in the compression chamber to be supplied to a molding apparatus, said conduit pipe being in fluid communication with the compression chamber; and
- a motor operatively associated with said piston for causing reciprocating movement of the piston within the compression chamber.

* * * * *